United States Patent
Overtoom

(10) Patent No.: US 7,152,190 B2
(45) Date of Patent: Dec. 19, 2006

(54) USB OTG INTELLIGENT HUB/ROUTER FOR DEBUGGING USB OTG DEVICES

(75) Inventor: Eric J. Overtoom, Grayslake, IL (US)

(73) Assignee: Motorola Inc., Schaumburg, IL (US)

( * ) Notice: Subject to any disclaimer, the term of this patent is extended or adjusted under 35 U.S.C. 154(b) by 534 days.

(21) Appl. No.: 10/770,993

(22) Filed: Feb. 3, 2004

(65) Prior Publication Data

US 2005/0182883 A1    Aug. 18, 2005

(51) Int. Cl.
*G06F 11/00*    (2006.01)

(52) U.S. Cl. .............. 714/44; 714/43; 714/25; 714/4; 714/5; 710/15; 710/18

(58) Field of Classification Search .............. 714/4, 714/5, 25, 43, 44; 710/15, 17, 18, 19
See application file for complete search history.

(56) References Cited

U.S. PATENT DOCUMENTS

| | | | |
|---|---|---|---|
| 6,732,218 B1 * | 5/2004 | Overtoom et al. ........ | 710/313 |
| 6,854,024 B1 * | 2/2005 | Barrenscheen et al. ...... | 710/19 |
| 7,000,057 B1 * | 2/2006 | Novell et al. ............. | 710/306 |
| 7,039,731 B1 * | 5/2006 | Hasegawa ................ | 710/38 |
| 7,058,734 B1 * | 6/2006 | Chen et al. .............. | 710/18 |
| 7,085,876 B1 * | 8/2006 | Lai et al. ................ | 710/313 |
| 2003/0056036 A1 * | 3/2003 | Carlton ................... | 710/15 |
| 2004/0019732 A1 * | 1/2004 | Overtoom et al. ......... | 710/313 |
| 2004/0088449 A1 * | 5/2004 | Sakaki .................... | 710/15 |
| 2004/0148539 A1 * | 7/2004 | Leydier et al. ........... | 713/500 |

OTHER PUBLICATIONS

Shareseek.com. Advanced USB Port Montior. No Date available. Shareseek.com. All pages.*
"Introduction to USB On-The Go", one page.
"Universal Serial Bus Specification", Compaq, Hewlett-Packard, Intel, Lucent, Microsoft, NEC, Philips, Revision 2.0, Apr. 27, 2000, Chapters 4 and 11, 77 pages.
"On-The-Go Supplement to the USB 2.0 Specification", Revision 1.0, Dec. 18, 2001, 37 pages.

* cited by examiner

*Primary Examiner*—Scott Baderman
*Assistant Examiner*—Tim Bonura
(74) *Attorney, Agent, or Firm*—Hisashi D. Watanabe; Joseph T. Cygan

(57) ABSTRACT

An apparatus, architecture and method for enabling the debugging of USB OTG devices under development is provided herein. An intelligent router (100) provides the capability to connect to a USB Dual Role Device (DRD) (102) under development, and obtain debugging information related to the USB interfaces, while also presenting a complete USB OTG compatible interface to another attached USB apparatus (106). The intelligent adapter (100) filters data transmitted by DRD (102), and passes data to attached PC (104) in a debugging setup.

6 Claims, 7 Drawing Sheets

FIG. 3
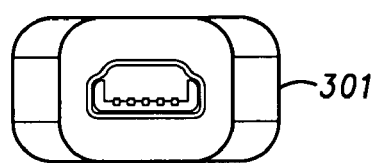
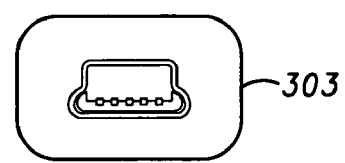
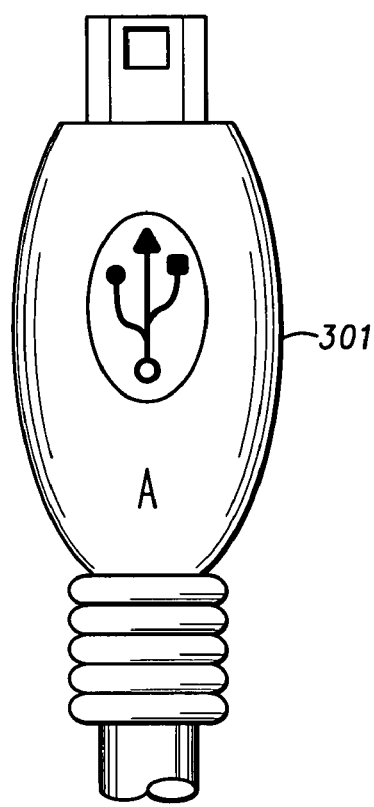
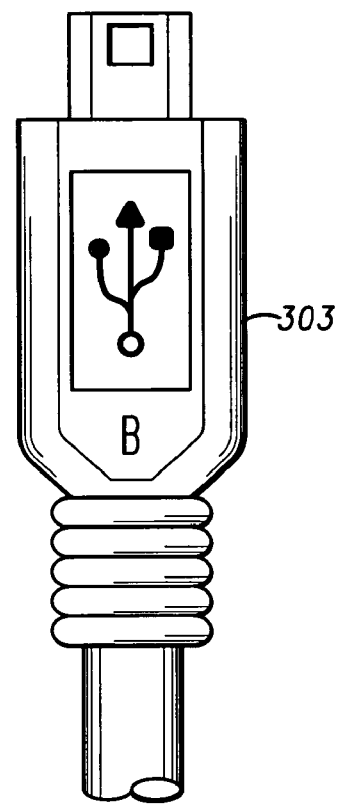
MINI-A PLUG                MINI-B PLUG

USB OTG INTELLIGENT HUB/ROUTER FOR DEBUGGING USB OTG DEVICES

FIELD OF THE INVENTION

The present invention relates generally to the Universal Serial Bus (USB) interface and to USB "On-the-Go" (OTG) devices, and more particularly to a USB intelligent hub/router for use in debugging USB OTG devices.

BACKGROUND OF THE INVENTION

In accordance with the USB OTG specifications, a device may use the USB interface and behave either as a USB host, communicating with other peripheral USB devices, or as a peripheral USB device providing a service or services to a USB host. One example of such a Dual Role Device (DRD), that is, a device that may operate as either a USB host or peripheral USB device, is a cellular telephone.

The USB OTG specification was designed to enable point-to-point connections between two devices and to reduce the USB 2.0 specification host support. Particularly, an OTG DRD is only required to support a single device. Further, the USB OTG specification describes a means for two devices to exchange host functionality, which is required for implementation of certain device use cases.

A problem exists, due to host functionality exchange, for devices that have debugging or data logging capability using the USB interface, for the purpose of aiding software development. For example, a device under development is typically attached to a personal computer (PC) running debugging or data logging software. Because the PC in such a configuration behaves as a USB host, the device under development must be connected and behave as a peripheral USB device. Therefore, the device under development must have a physical USB device connector. The problem is that, because the device under development has only a single physical connection, and must be connected to a PC host during debugging, the device cannot be simultaneously connected to a USB OTG device and therefore cannot be observed and debugged while interacting with a USB OTG device.

Some USB DRDs may have an alternative attachment means, such as an embedded debug port with a physical connector other than a USB physical connector, for connecting to debugging equipage. However, such connections are not always available on a device. It is undesirable to design a DRD to have a specialized debug port, in addition to a USB port, due to cost and product profile considerations. Further, even if a distinct debugging port is available, performance reasons may render the use of the port for USB debugging unviable. For example, if problems occur in a device under development when the device is connected to a second USB device and thus using USB OTG features, it is desirable to use software debugging features of the device under development to observe the USB interface.

Further problematic is that, even if a device under development comprises a separate means to connect to a PC for debugging, the function drivers within the test device are generally designed and written to handle a peripheral type connection. Thus, substantial modifications may be required to the device development support software, such that operation of the test device as a USB OTG host would be supported.

Therefore, a need exists for an apparatus in which a USB Host may be connected between two USB OTG devices such that the USB OTG connection is not interfered with, and further such that the communications between the two USB OTG devices may be monitored.

BRIEF DESCRIPTION OF THE DRAWINGS

FIG. 3 is a mechanical drawing illustrating various USB mini-plugs in accordance with USB standards.

DETAILED DESCRIPTION OF THE PREFERRED EMBODIMENTS

Figure 1:
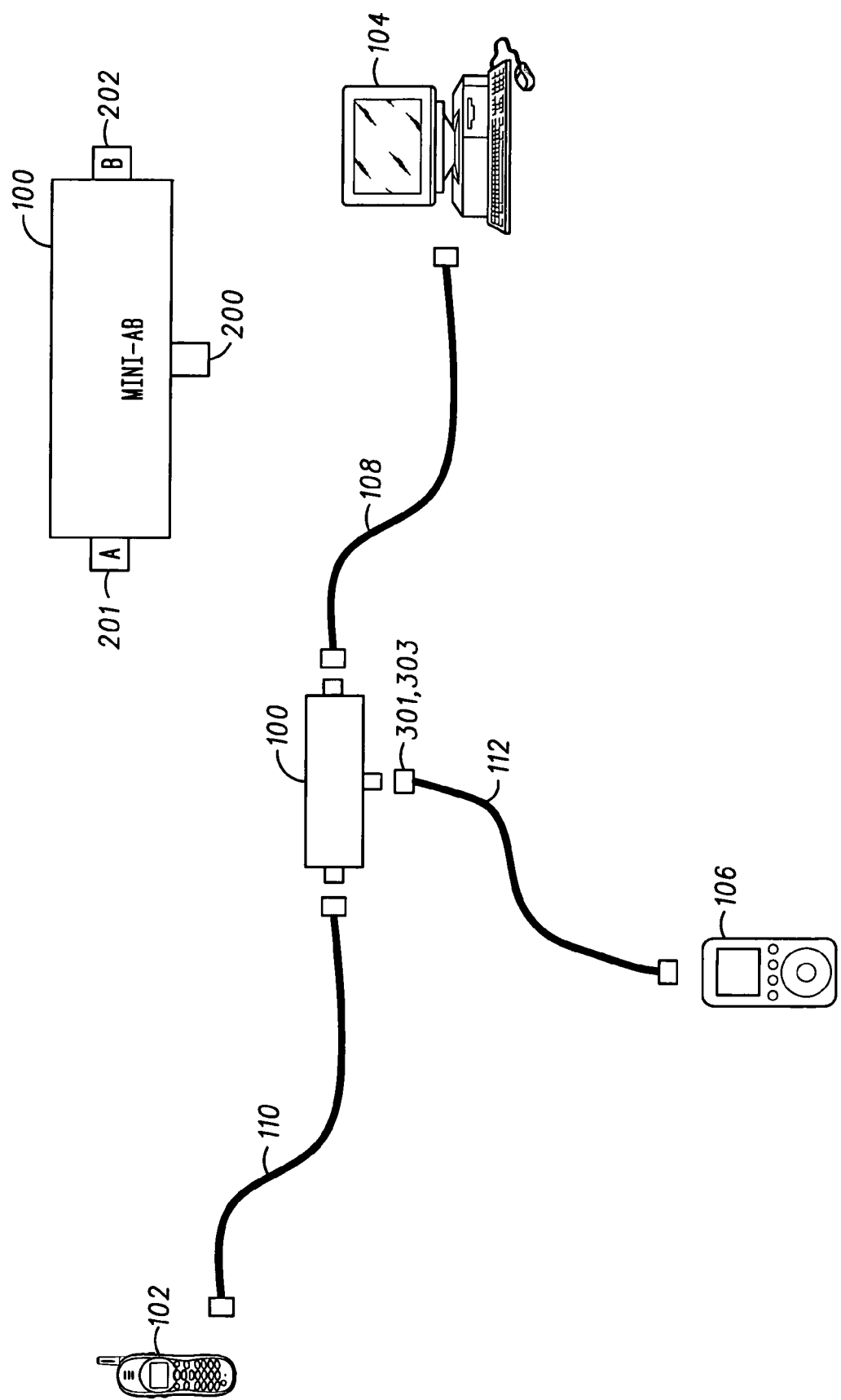
FIG. 1 is a schematic connection diagram for a USB OTG Intelligent Router, in accordance with an embodiment of the present invention, illustrating a typical debugging setup.

To address the above-mentioned need, an apparatus, architecture and method for enabling the debugging of a USB OTG device by monitoring the devices USB device to USB host link is provided herein.

In accordance with the present invention, an Intelligent Hub/Router is used to route information among three separate USB ports such that debugging information can be routed to one port, for use by a PC, while the other two ports function as closely as possible to simple cable connections between the DRD under development and another device. The Intelligent Hub/Router of the present invention enables two USB OTG devices to communicate, exercising the full USB OTG stack and operations of each device, while maintaining a debugging link for observing software operations of the DRD under development.

The Intelligent Router of the present invention is capable of changing its internal configuration, and selectively routing information over the USB OTG link, depending upon whether the DRD under development is operating as a USB host or as a USB device. The Intelligent Router is also able to selectively route information based upon whether or not a PC is present on the Intelligent Router's debugging port.

A first benefit derived from the embodiments of the present invention is the capability to obtain debugging information related to the USB interface of a device under development, while also presenting a complete USB OTG compatible interface useable by other attachable devices. In the embodiments of the present invention, an Intelligent Router filters data transmitted by the attached device under development, and passes the data to an attached PC in a debugging setup.

A second benefit derived from the embodiments of the present invention is that a USB device under development can be debugged with respect to its interaction with other USB OTG devices, without the need for physical or software modifications to the device under development.

A first aspect of the present invention is an intelligent router comprising a first connection point for communicating with a first USB OTG apparatus using a virtual USB OTG interface and a virtual debugging interface. A second connection point of the intelligent router can be connected to a debugging host computer and appear as a debugging USB device with respect to the computer, even when the OTG apparatus is configured as a USB host. A third connection point of the intelligent router can be connected to a second OTG apparatus and can function as a proxy for the first OTG apparatus, appearing as a USB device or a USB host, depending upon the configuration of the two USB apparatuses, determined by the USB Host Negotiation.

A second aspect of the present invention is a method of debugging a USB OTG apparatus comprising passing, by a USB intelligent router, USB OTG Host Negotiation Protocol requests bi-directionally between the first USB OTG apparatus and a second USB OTG apparatus; determining if the first USB OTG apparatus is configured as a USB host or a USB device; and copying data bi-directionally between the two USB OTG apparatuses if the first USB OTG apparatus is configured as a USB host; and presenting a USB OTG interface if the first USB OTG apparatus is configured as a USB device. The method routes debugging data from the first USB OTG apparatus to a development host computer over a virtual debugging interface.

Turning now to the drawings where like numerals designate like components, FIG. 1 is a schematic connection diagram illustrating a typical debugging setup. A USB OTG Intelligent Router 100, in accordance with the present invention, is connected to a USB OTG DRD 102 under development via a cable 110. The USB OTG Intelligent router 100 is further connected to a PC 104 via a cable 108, and a second USB OTG apparatus 106, via a cable 112. The cables 108, 110, and 112, have suitable USB connector plugs for each respective device in the setup illustrated by FIG. 1, as well as for the USB OTG Intelligent Router 100. Likewise, the USB OTG Intelligent Router 100 has suitable USB receptacles; USB Type A receptacle 201, USB Type B receptacle 202, and USB mini-AB type receptacle 200.

Figure 2:
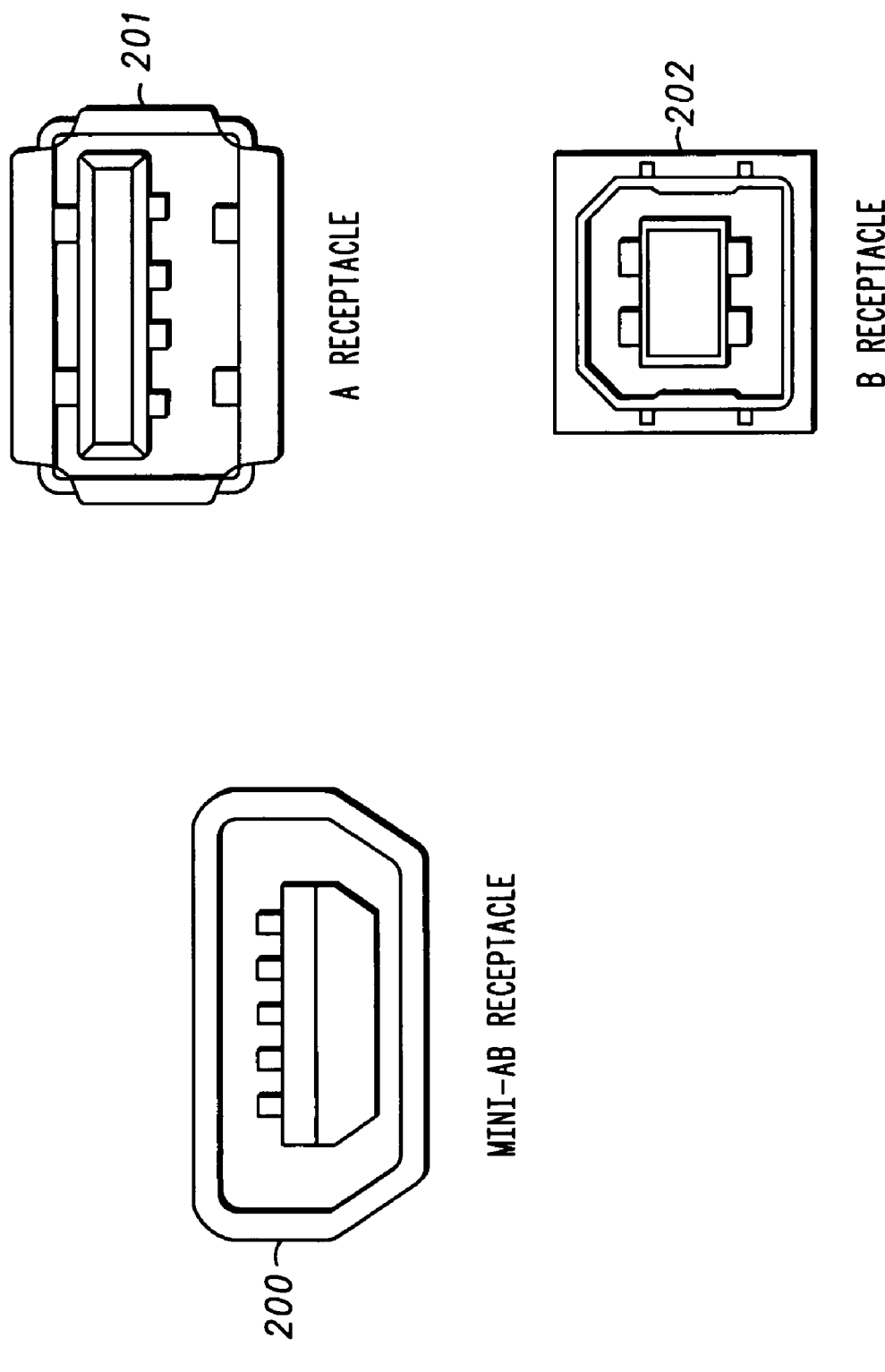
FIG. 2 is a mechanical drawing illustrating various USB receptacle types in accordance with USB standards.
Figure 4:
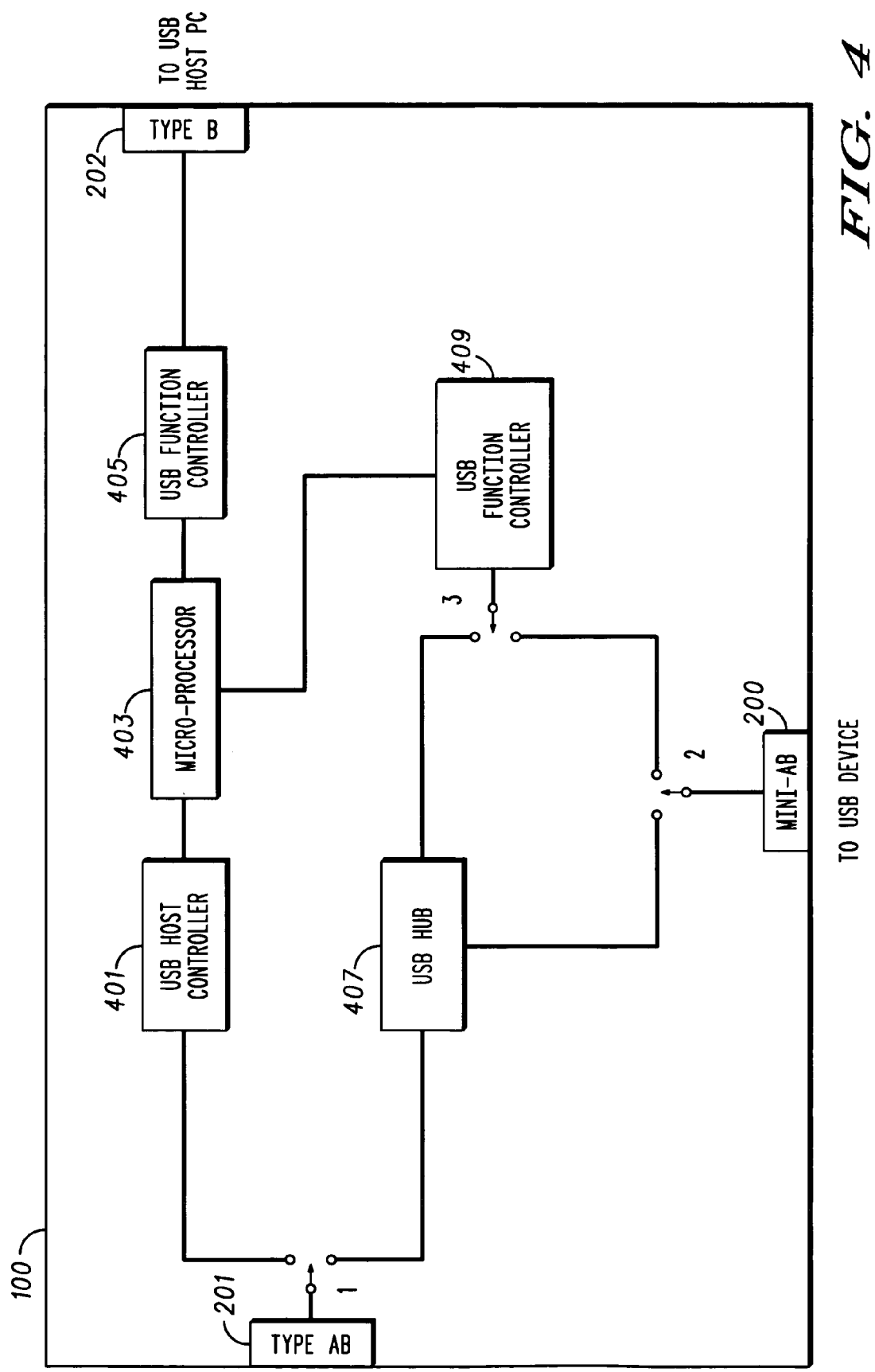
FIG. 4 is a block diagrams illustrating various hardware and software components of a USB OTG Dual Role Device under development and a USB OTG Intelligent Router, in accordance with an embodiment of the present invention.

FIG. 2, which is for illustrative purposes only, is a mechanical drawing providing a cross sectional view of each of the connection receptacle types 200, 201 and 202, of the USB OTG Intelligent Router 100. FIG. 4, also for illustrative purposes, shows a top and end view of a USB mini-A plug 301 and USB mini-B plug 303, either of which may terminate an end of cable 112 and be connectable to the USB OTG Intelligent Router 100 connection 200. The USB specifications define upstream data as data that flows toward a USB host, and downstream data as data that flows away from a USB host. Further in accordance with the definitions of the USB specifications, a downstream port receives upstream data traffic while an upstream port receives downstream data traffic. The mini-AB receptacle 200 can accommodate a mini-A 301 or mini-B 303 plug and can therefore behave as a USB upstream or downstream port, upon initial cable connection, as required by the connected USB OTG product 106.

FIG. 4 is a block diagram that illustrates the hardware components of a USB OTG Intelligent Router 100, in accordance with an embodiment of the present invention. The USB Intelligent Router 100 comprises: USB host controller 401, micro-processor 403 and associated memory (not shown), two USB function controllers 405 and 409, USB hub 407, and logical switches 1, 2, and 3. The USB Intelligent Router 100 also comprises the USB receptacles, which are also shown schematically in FIG. 1, 200, 201 and 202.

Micro-processor 403 is used to control the configuration of the Intelligent Router 100, and to route information among the various ports. In accordance with the embodiments of the present invention, the Intelligent Router 100 does not behave as a mere USB Hub in simply copying and distributing information among ports, but rather the Intelligent Router 100 is capable of filtering information content and, if required rerouting the information to the appropriate port. Micro-processor 403 communicates with USB host controller 401 and with USB function controllers 405 and 409, for the purpose of moving data into and out of the Intelligent Router 100.

The Intelligent Router 100 routes information from a DRD under development to an attached USB device and also to an internal USB function. In this respect, the Intelligent Router 100 does behave as a normal USB hub in that it routes information from the upstream port of a DRD under development, to the downstream ports for an attached USB device and an attached PC.

Returning to FIG. 4, USB function controller 405 is used to communicate with an attached PC. The function controller 405 carries data and command packets from the DRD debugging interface. The function controller 409 is used to receive information from either the DRD under development, attached at port 201, or the attached USB device, attached at port 200. If the DRD under development is behaving as a USB host, then function controller 409 will be configured to be a debugging device destination, enabling the DRD under development to transmit debugging information and receive command packets.

The USB host controller 401 is used when a DRD under development is configured to behave as a USB peripheral device. The configuration of the Intelligent Router 100 is then such that the Intelligent Router 100 is able to pass along data packets received from both the attached USB device, attached at port 200, and the attached PC, attached at port 202.

The Intelligent Router 100 is capable of changing its configuration based upon whether an attached DRD behaves as a USB host or USB device. If the DRD, for example DRD 102, operates as a host, then the attached USB device, for example USB device 106 will operate as a peripheral. Returning to FIG. 4, and the assumption that DRD 102 is operating as a host, Intelligent Router 100 internal switch 1 will connect DRD 102 to the Intelligent Router upstream port. Switch 2 will connect USB device 106 to an Intelligent Router 100 downstream port, and switch 3 will connect the function controller 409 to an Intelligent Router 100 downstream port. In this case, the micro-processor 403 will use both function controllers, 405 and 409. Data that is received by one of the function controllers will be copied to the other function controller, by micro-processor 403, enabling host-to-host communication between the PC 104 and DRD 102.

The function controller 405 will present the PC 104 with an interface identical to the DRD 102 as if DRD 102 were configured for debugging operation. The PC host 104 will use the debugging interface to issue commands and read data.

The function controller 409 will act as a "debug device" attached to the DRD 102. The DRD 102 will enumerate this "debug device" and load a particular class device driver. The class device driver will then present a software interface to the DRD 102 debugging software. It is to be understood that additional drivers may also be loaded to support the functions of attached USB device 106. The DRD 102 debugging software presents information to be sent to the device driver which is transmitted to function controller 409. The micro-processor 403 then copies the information to the function controller 405, which further provides the information to PC 104.

Figure 5:
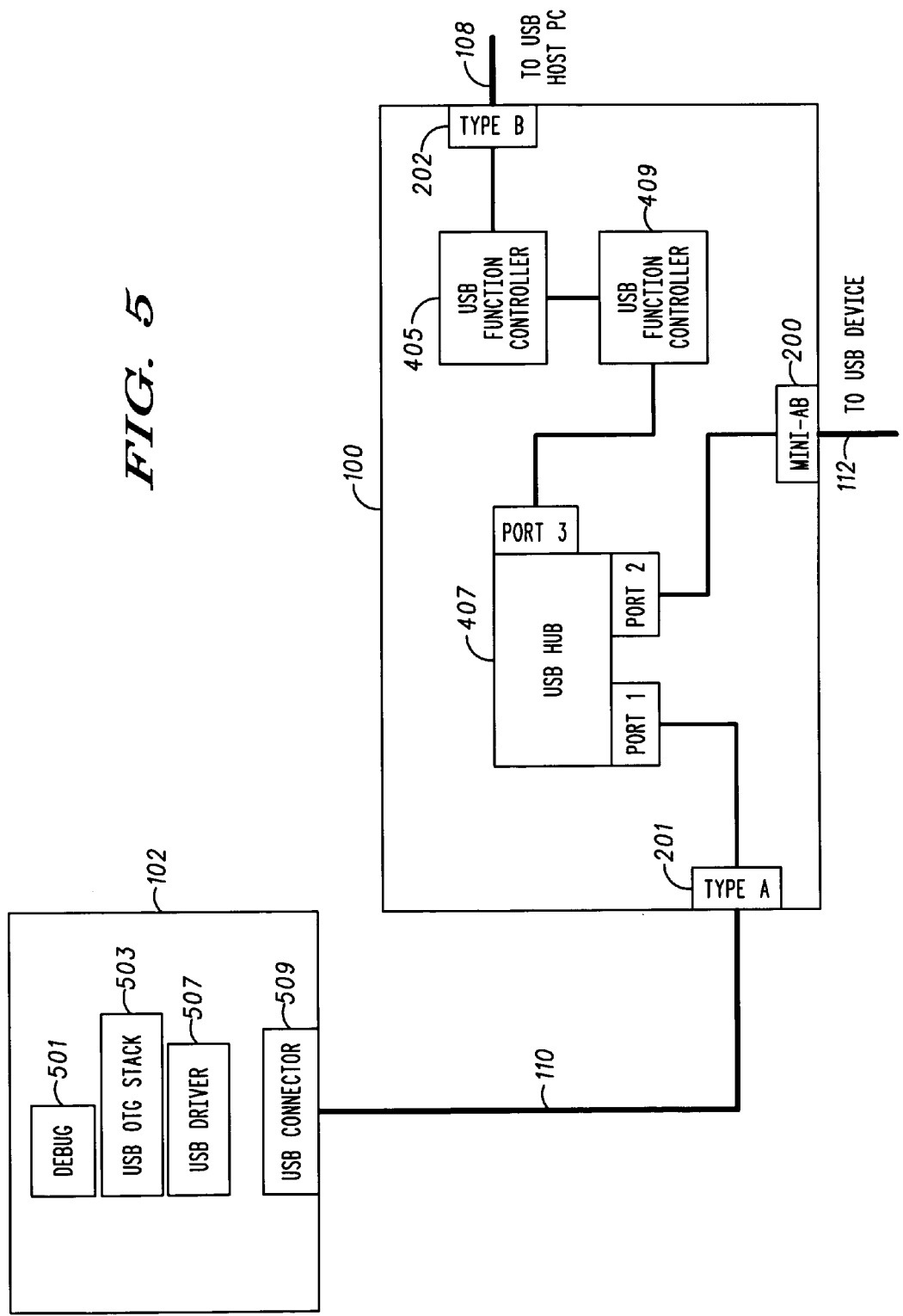
FIG. 5 is a modification of the block diagram of FIG. 4, to illustrate a first internal configuration of a USB OTG Intelligent Router in accordance with an embodiment of the present invention.

FIG. 5 illustrates the above described configuration in which the DRD 102 is operating as a host. In FIG. 5, which is for illustrative purposes, only the primary components of the configuration are shown. Also shown in FIG. 5 are the software elements of DRD 102, and a hardware connector 509.

The DRD 102 software comprises a debug module 501, a USB OTG stack 503, and a USB driver 507. The debug module 501 would communicate directly with PC 104, in which PC 104 is a host, if the DRD 102 were connected directly to the PC 104. Likewise, if the USB apparatus 106 were connected directly to the DRD 102, then the USB OTG stack 503 and driver 507 would communicate with a like USB OTG stack on USB apparatus 106.

For the configuration shown in FIG. 5, the USB host controller 401 is not required, and is therefore disconnected. The intelligent router 100 appears as a USB device with respect the DRD 102, which behaves as a host. The function controller 409 assumes the role of a "debug device" with the respect to the DRD 102 as a host, as previously described. Because the external PC 104 is also a host, the intelligent router 100 appears as a device with function controller 405 presenting the debug interfaces.

In a second configuration of the Intelligent Router 100, DRD 102 operates as a USB device, rather than as a host. In this case Switch 1 as shown in FIG. 4, connects port 201 to host controller 401. Switch 2 connects the function controller 409 to port 200, and Switch 3 connects Switch 2 to function controller 409. The DRD 102 will present a USB configuration having a first virtual interface for debugging functions, and at least one additional virtual interface for the functions it would normally present in operating as a USB device. The DRD 102 may therefore present multiple virtual interfaces in addition to the debugging virtual interface.

In this second configuration of the Intelligent Router 100, micro-processor 403 configures function controller 409 such that function controller 409 presents an interface that matches the DRD 102 interface in normal operation. The attached USB device 106, which is behaving as a USB host, therefore actually communicates with a proxy element within the Intelligent Router 100, rather than communicating directly with the DRD 102. Any data that is received by the proxy function, namely the function controller 409, from the attached USB device 106, which is a USB host, is passed to the DRD 102 through the host controller 401. The Intelligent Router 100 in this case simply copies information across the link from attached USB host 106 to DRD 102.

The micro-processor 403 also controls host class operation for the debug information by reading information presented by DRD 102, and copying the information to function controller 405. The function controller 405 then presents the information to attached PC 104.

The micro-processor 403 also participates in the Host Negotiation Protocol (HNP) between the DRD 102 and attached USB device 106. The USB specifications OTG supplement defines HNP which is how USB devices determine which will operate as a host and which as a peripheral. To perform its HNP function, micro-processor 403 responds to requests from one side of the link, and passes the requests to the other side. Timing synchronization is also performed by micro-processor 403 during HNP such that the two separate links, one from each USB device, appear to the devices as if there were no intervening hub.

Figure 6:
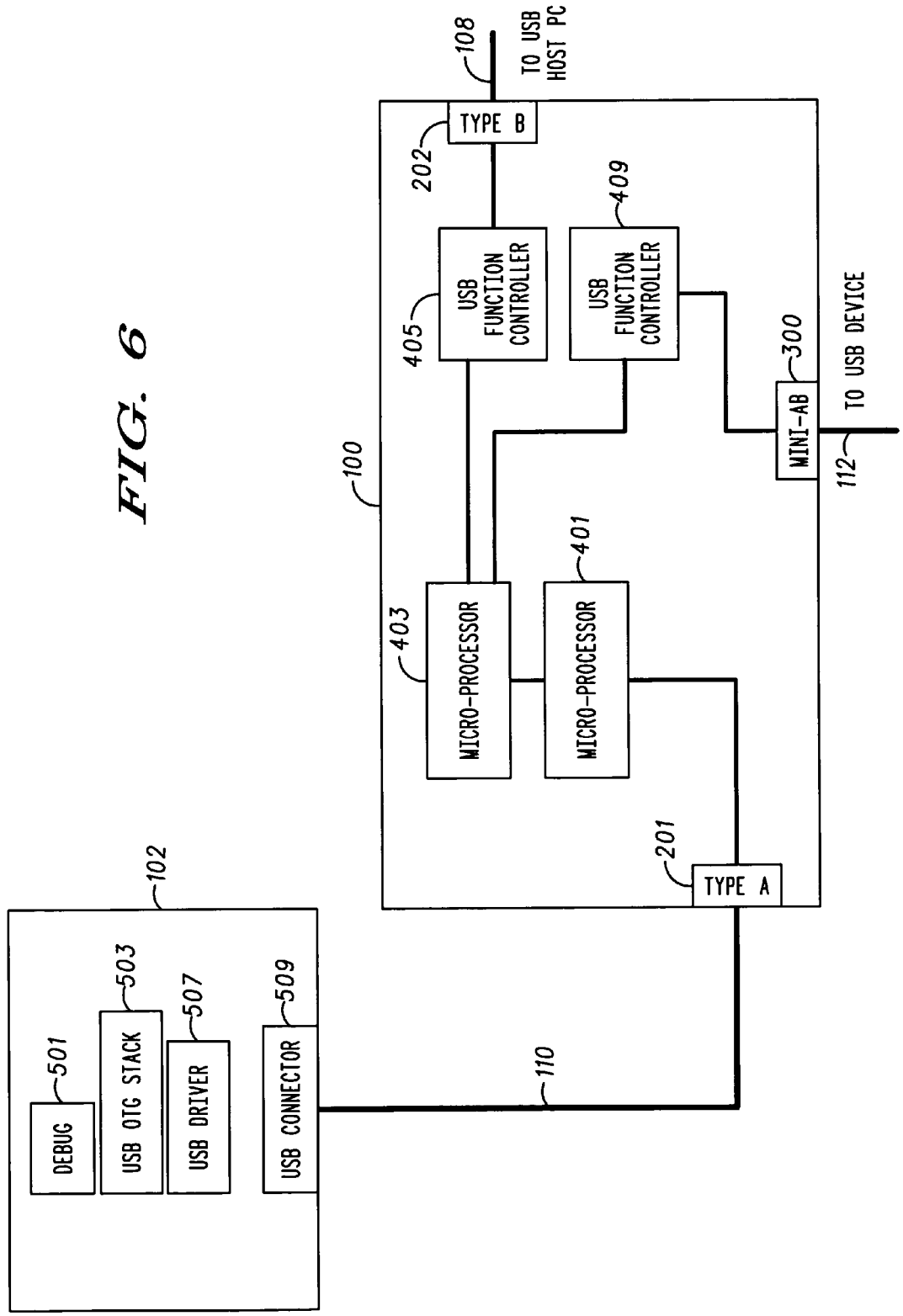
FIG. 6 is a modification of FIG. 4, to illustrate a second internal configuration of a USB OTG Intelligent Router in accordance with an embodiment of the present invention.

FIG. 6 illustrates the above described configuration in which the DRD 102 is operating as a peripheral USB device. In FIG. 6, which is for illustrative purposes, only the primary components of the intelligent router 100 configuration are shown. The DRD 102 is also shown for illustrative purposes.

For the configuration shown in FIG. 6, the USB hub 407 is not required and is disconnected. In this case, the intelligent router 100 appears as a host with respect to DRD 102, and therefore only the USB host controller 401 is required.

The intelligent router 100 appears as a peripheral USB device with respect to attached USB apparatus 106. The function controller 409 essentially mimics the DRD 102 interface that would be presented to attached USB apparatus 106 if it were connected directly to the DRD 102. In this case, USB apparatus 106 behaves as a USB host.

Because the PC host 104 is always a USB host with respect to the intelligent router 100, the intelligent router 100 must behave as a peripheral USB device at its connection 202. As previously described for the configuration illustrated by FIG. 6, the micro-processor reads debug information presented by the DRD 102 and copies the information to function controller 405. The PC 104 then reads the debug information from the function controller 405.

Figure 7:
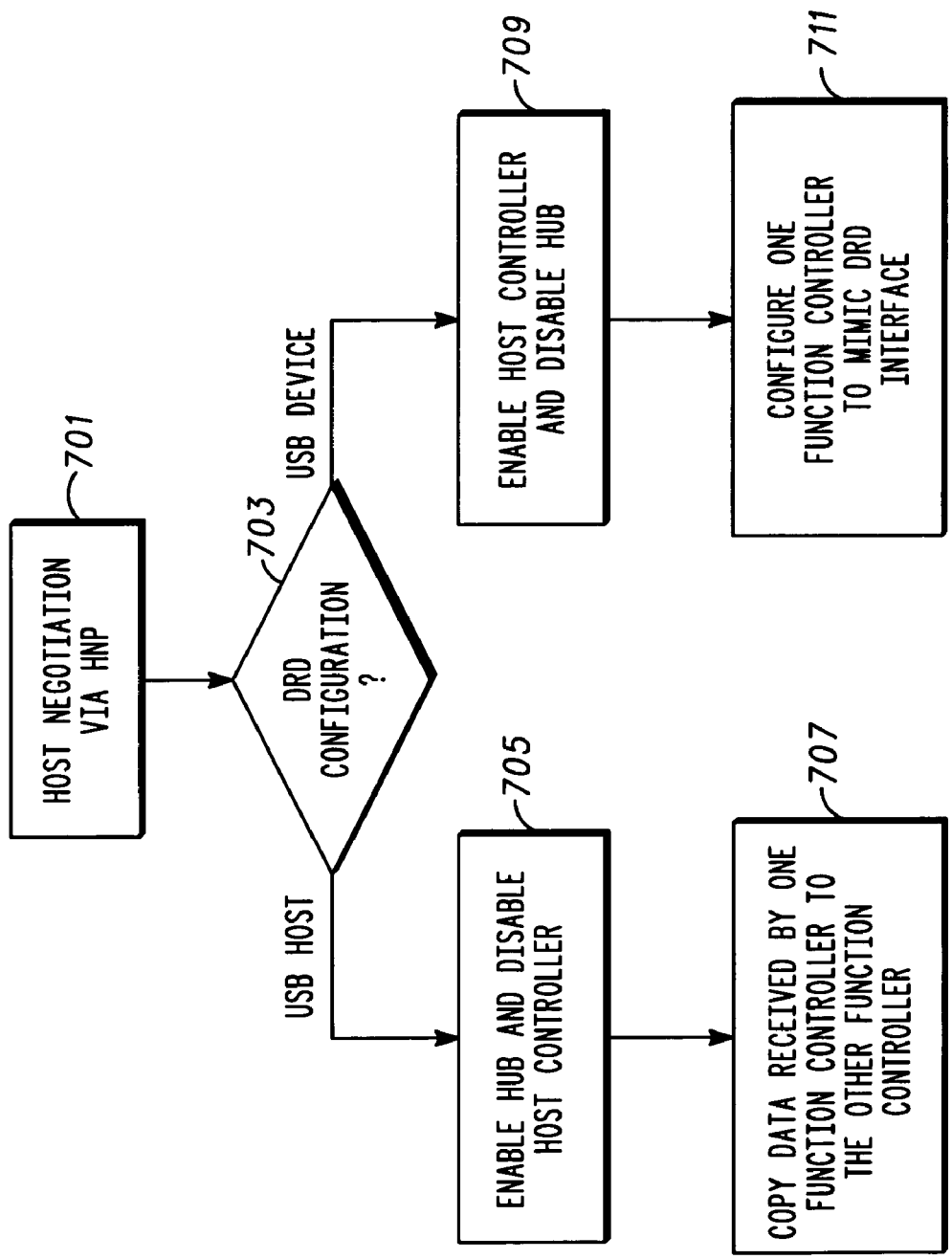
FIG. 7 is a block diagram illustrating a basic operation of a micro-processor for configuration of a USB OTG Intelligent Router in accordance with an embodiment of the present invention.

Turning now to FIG. 7, a block diagram is provided that is helpful toward understanding the role of micro-processor 403 for configuring the intelligent router 100. FIG. 7 is for illustrative purposes only, and shows the basic operations performed by micro-processor 403 depending on whether DRD 102 is a host or peripheral device with respect to attached USB apparatus 106. In block 701, micro-processor 403 passes HNP requests between DRD 102 and USB apparatus 106 until resolution of the host per the USB specification and OTG supplement in block 703.

If the DRD 102 is the host, then the micro-processor 403 enables the hub 407 and disables the host controller 401 as shown in block 705. The micro-processor 403 then proceeds to copy data between the function controllers 405 and 409, as shown in block 707 and as previously described.

If DRD 102 is the peripheral device, then the micro-processor 403 enables the host controller 401 and disables the hub 407 as shown in block 709. The micro-processor 403 then configures function controller 409 to mimic the DRD 102 interfaces to attached USB apparatus 106 as shown in block 711.

In some embodiments of the present invention, the intelligent router 100 may be constructed using separate components for the micro-processor 403, and its associated memory, the USB host controller 401 and the related USB transceivers for each USB port, as well as the function controllers 405 and 409. However, some embodiments may use integrated components that comprise some or all of the necessary components and still remain in accordance with the present invention. The USB Hub 407 may be designed as described in the U.S. patent application Ser. No. 10/206286 to Overtoom, Eric, et al., filed Jul. 26, 2002, titled "A Dual-Role Compatible USB Hub Device and Method" (Attorney Docket No. CS20019RL), which is commonly owned by the assignee of the present invention.

It is to be understood that by using the intelligent router 100, the DRD 102 software will operate as closely as possible to its normal operation. Even though the DRD 102 OTG link may change from being a USB host to being a peripheral USB device, the USB operation of the links carrying the debug information remain unchanged. Therefore, using the embodiments of the present invention, it is not required to change the DRD 102 debug interfaces.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A USB OTG intelligent router comprising:
   a first connection point for communicating with a first USB OTG apparatus using a virtual USB OTG interface and a virtual debugging interface;
   a second connection point for communicating with a computer using a debugging interface wherein said intelligent router appears as a peripheral with respect to said computer; and
   a third connection point for communicating with a second USB OTG apparatus wherein said intelligent router appears to said second USB apparatus as one of a USB device and a USB host.

2. The USB OTG intelligent router of claim 1, further comprising:
   a first logical switch coupled to said first connection point;
   a USB host controller coupled to said first logical switch;
   a micro-processor coupled to said USB host controller;
   a first USB function controller coupled to said micro-processor and to said second connection point;
   a second USB function controller coupled to said micro-processor and to a second logical switch;
   a third logical switch coupled to said second connection point; and
   a USB Hub coupled to said first, second and third logical switches.

3. The intelligent router of claim 2, wherein said microprocessor is configured to:
   pass UDB OTG Host Negotiation Protocol requests bi-directionally between said first USB OTG apparatus and said second USB OTG apparatus;
   determine a configuration of said first USB OTG apparatus, said configuration being determined by said Host Negotiation Protocol; and
   perform configuration of said intelligent router based upon said configuration of said first USB OTG apparatus.

4. The intelligent router of claim 3, wherein said configuration of said intelligent router comprises:
   enabling said USB hub, disabling said USB host controller and copying data bi-directionally between said first USB function controller and said second USB function controller if said first USB OTG apparatus is configured as a USB host; and
   enabling said USB host controller, disabling said USB hub and configuring said second USB function controller to present a USB OTG interface if said first USB OTG apparatus is configured as a USB device.

5. A method of debugging a first USB OTG apparatus comprising:
   passing, by a USB intelligent router, USB OTG Host Negotiation Protocol requests bi-directionally between said first USB OTG apparatus and a second USB OTG apparatus;
   determining whether said first USB OTG apparatus is configured as a USB host or a USB device, said configuration being determined by said Host Negotiation Protocol;
   copying data bi-directionally between said first USB OTG apparatus and said second USB OTG apparatus if said first USB OTG apparatus is configured as a USB host; and
   presenting a USB OTG interface if said first USB OTG apparatus is configured as a USB device.

6. The method of claim 5 further comprising:
   routing data from said first USB OTG apparatus over a virtual debugging interface to a development host computer.

* * * * *